(12) United States Patent
Wonfor et al.

(10) Patent No.: US 7,395,545 B2
(45) Date of Patent: Jul. 1, 2008

(54) METHOD AND APPARATUS FOR PROVIDING COPY PROTECTION USING A TRANSMITTAL MODE COMMAND

(75) Inventors: Peter J. Wonfor, El Granada, CA (US); Derek T. Nelson, Menlo Park, CA (US)

(73) Assignee: Macrovision Corporation, Santa Clara, CA (US)

( * ) Notice: Subject to any disclaimer, the term of this patent is extended or adjusted under 35 U.S.C. 154(b) by 1248 days.

(21) Appl. No.: 10/077,397

(22) Filed: Feb. 15, 2002

(65) Prior Publication Data

US 2002/0172362 A1 Nov. 21, 2002

Related U.S. Application Data

(63) Continuation of application No. 09/142,039, filed on Aug. 31, 1998, now Pat. No. 6,381,747.

(51) Int. Cl.
*H04N 7/16* (2006.01)
(52) U.S. Cl. ............................ 725/25; 386/94; 380/201; 380/203; 725/104
(58) Field of Classification Search .................. 725/25, 725/31, 134, 142, 104, 152, 153; 380/201, 380/203, 204; 360/60; 386/1, 94
See application file for complete search history.

(56) References Cited

U.S. PATENT DOCUMENTS

| | | | |
|---|---|---|---|
| 4,631,603 A | | 12/1986 | Ryan |
| 4,890,319 A | | 12/1989 | Seth-Smith et al. |
| 4,914,694 A | | 4/1990 | Leonard et al. |
| 5,130,810 A | * | 7/1992 | Ryan ............................ 386/9 |
| 5,315,448 A | * | 5/1994 | Ryan ............................ 360/60 |
| 5,418,853 A | | 5/1995 | Kanota et al. |
| 5,574,787 A | | 11/1996 | Ryan |
| 5,590,194 A | * | 12/1996 | Ryan ............................ 380/213 |
| 5,654,747 A | | 8/1997 | Ottesen et al. |

(Continued)

FOREIGN PATENT DOCUMENTS

EP 0 691 787 A1 1/1996

(Continued)

*Primary Examiner*—Ngoc K Vu
(74) *Attorney, Agent, or Firm*—George B. Almeida

(57) ABSTRACT

A method and system of providing copy protection of video analog and digital signals and the like, wherein the signals are transmitted via a digital delivery network, and may comprise, for example, pay-per-view (PPV) program materials protected by copyrights of respective program rights holders. The right holders authorize video service providers (3) to apply copy protection to the program material. The copy protection process is supplied to the rights holders or the service providers (3) by a copy protection process licensor. The video service providers (3) supply suitable copy protection control software via respective control and billing (tracking) centers to generate commands which activate, control and reconfigure the copy protection process being applied to the programs being transmitted. A set-top box (10) is provided to each consumer and contains a copy protection circuit which is adapted to apply selected anticopy waveforms to the video signal corresponding to the program material in response to the commands from the service providers (3). Usage data pertinent to each consumer is returned by the set-top box (10) to the service providers (3), which then report the copy protection usage to the respective rights holders and process licensor.

17 Claims, 4 Drawing Sheets

U.S. PATENT DOCUMENTS

| | | | |
|---|---|---|---|
| 5,668,873 A * | 9/1997 | Yamauchi | 705/57 |
| 5,675,647 A | 10/1997 | Garneau et al. | |
| 5,680,457 A | 10/1997 | Bestler et al. | |
| 5,737,417 A | 4/1998 | Buynak et al. | |
| 5,799,081 A * | 8/1998 | Kim et al. | 380/203 |
| 5,889,919 A * | 3/1999 | Inoue et al. | 386/94 |
| 5,907,655 A * | 5/1999 | Oguro | 386/94 |
| 6,002,694 A | 12/1999 | Yoshizawa et al. | |
| 6,002,830 A | 12/1999 | Quan | |
| RE36,763 E | 7/2000 | Kanota et al. | |

FOREIGN PATENT DOCUMENTS

| | | |
|---|---|---|
| JP | 08-077706 | 3/1996 |

* cited by examiner

METHOD AND APPARATUS FOR PROVIDING COPY PROTECTION USING A TRANSMITTAL MODE COMMAND

CROSS REFERENCE TO RELATED APPLICATION

This application is a continuation of Application No 09/142,039, filed Aug. 31, 1998 now U.S. Pat. No. 6,381,747.

BACKGROUND OF THE INVENTION

1. Field of the Invention

This disclosure is directed to a method of controlling copy protection in digital video networks where it is desired to copy protect an analog or digital video output signal associated with a digital video network.

2. Background of the Invention

Various well known copy protection schemes for video signals include that disclosed in U.S. Pat. No. 4,631,603, John 0. Ryan, Dec. 23, 1986 and assigned to Macrovision Corporation, incorporated by reference, directed to modifying an analog video signal to inhibit making of acceptable video recordings therefrom. This discloses adding a plurality of pulse pairs to the otherwise unused lines of a video signal vertical blanking interval, each pulse pair being a negative-going pulse followed closely by a positive-going pulse. The effect is to confuse AGC (automatic gain control circuitry) of a VCR (video cassette recorder) recording such a signal, so that the recorded signal is unviewable due to the presence of an excessively dark picture when the recorded signal is played back.

Another analog video protection scheme is disclosed in U.S. Pat. No. 4,914,694 issued Apr. 3, 1990, to Leonard, and assigned to Eidak Corp., incorporated by reference. The Eidak system (see Abstract) increases or decreases the length of each video field from the standard length, either by changing the time duration of the respective horizontal line intervals in each field while keeping a constant, standard number of lines per frame, or by changing the number of horizontal line intervals which constitute a frame while maintaining the standard duration of each line interval.

These video protection systems modify the video signal to be recorded (for instance on tape) or to be broadcast (for instance protected pay-per-view television programs) to make copying by ordinary VCRs difficult or impossible. When a video tape on which is recorded the copy protected video signal is played back for viewing using a VCR, the copy protection process is essentially transparent, i.e., it does not interfere with viewing. However, any attempt made to copy the video signal from the tape using a second VCR to record the output of the first (playback) VCR yields a picture degraded to some extent, depending on the efficacy of the particular copy protection system. These present video copy protection systems protect only analog video signals, which are the type of video signals broadcast and recorded using current consumer video technology.

Some digital and hybrid solutions to the copy protection problem were solved by U.S. Pat. No. 5,315,448, issued May 24, 1994, issued to Ryan and assigned to Macrovision Corporation, incorporated by reference. This patent is directed to copy protection for use with digital signal recording where it is desired to copy protect both an analog and digital signal associated with a digital VCR, and any signal material where the original source material is not copy protectable.

FIG. 1 of U.S. Pat. No. 5,315,448, in its upper left portion, illustrates an analog video signal indicated by "A" supplied at input terminal 12 which in turn is coupled to an ACP (anti-copy process) detector 26 and an analog to digital converter 16. When an analog (NTSC) video signal is received at terminal 12, upon detecting the presence of a copy protection signal ACP detector 26 generates a disable recording control signal on line 28. The control signal then disables (for instance) the analog to digital converter. Alternatively, the analog video signal at terminal 12 is converted to the desired digital format at converter 16, which provides a digital video signal "D" at its output.

A fundamental revolution is under way that will dramatically affect the delivery of home entertainment. Consumers will soon have hundreds of viewing options from which to choose because of advances in digital compression technologies and the associated reduction in costs accompanying each advance. Because of the increased number of channels more channels will be allocated for pay-per-view (PPV). The increased number of PPV channels will mean video service providers (VSP), also known as PPV providers or system operators, can provide a greater number of movies and more start times, ultimately changing the way many consumers purchase and view movies in their homes. Already, market research experts are predicting that the pay-per-view business will rival today's videocassette rental and sell-through business within 3-5 years.

Even with such a positive outlook for the future of PPV, the full benefits to the consumer of PPV programming may be delayed unless new digital video networks can protect PPV program copyrights. Rights owners are concerned that when digital programming is delivered to the home any digital set-top box will be able to produce a commercial quality video when recorded by a consumer VCR.

SUMMARY OF THE INVENTION

In this new world of direct-to-home video programming, video service providers will be called upon to protect PPV programming against unauthorized copying. They will be obligated to develop and manage the headend (cable) or uplink (satellite) systems which monitor, control, track, and report the application of copy protection on each pay-per-view video program. To this end, the present invention provides copy protection management framework which meets these needs while complementing the more technically detailed copy protection management strategy for video service providers. This framework serves to integrate all components of copy protection delivery in a digital network, and is designed to fit the diverse needs of DBS, Telco, and Cable operators while meeting the requirements of rights owners for a robust and secure environment in which to deliver copy protected PPV programming.

The value of PPV copy protection is maximized when the appropriate control and tracking systems are in place at the video service provider's control and billing centers. These control and tracking systems are best specified during the design phase of the digital signal material delivery system. At a minimum, the following system components are required:

Copy protection-capable set-top boxes

Capability to deliver programmable copy protection configuration

Capability to deliver real time on/off/mode command

Transaction/billing reporting systems/programs

A control and tracking system in accordance with the invention, for providing copy protection for a typical digital delivery system can be best understood through a short case study which begins when a consumer, that is a subscriber, receives a new set-top box. Each set-top box includes a copy protection capable digital-to-analog encoder chip. When the set-top box is initially powered on, the encoder chip is remotely programmed via a video service provider with the desired copy protection configuration. Thus the video service provider's system management software (SMS), also termed hereinafter as system control software (SCS), has the ability to store and track the designated configuration. The configuration information applies to all copy protected programming and is updated only when a video service provider is informed of a change in the process or when a set-top box is initialized.

The copy protection status or option of each program is contained in the video service provider's system control software database. There are several potential copy protection status options. For example, a first option is for copy protection which allows for viewing only at a PPV transaction fee. A second option is for copy protection which allows for taping at a higher transaction fee. A third option is for non-protected program material for which no copy protection is required (for example, broadcast television).

When the consumer selects a viewing choice via an electronic program guide, a correct menu of options is displayed. Once a PPV program is selected by the consumer, the correct copy protection status is applied as determined by the consumer's chosen option and scheduling software of the system control software database. Either the headend/uplink facility's control software or software at the set-top box can determine and send the appropriate on/off/mode command to the copy protection capable digital-to-analog chip of previous mention.

The headend/uplink software communicates the on/off/mode command to the set-top box to correctly set the copy protection for a particular program. The system scheduling software has the capability to prevent copy protection from being applied to any type of program other than PPV programming since copy protection is licensed only for use on PPV programming. After a PPV program is viewed by a consumer, the set-top box is able to communicate to a billing subsystem of the system control software all relevant transaction data. From this data the billing subsystem is able to add this information to copy protection activity reports. These reports contain information such as the number of purchases, retail price, and copy protection usage fees owed to a licensor.

The copy protection process is applied to the analog video signal just prior to its exiting the consumer's set-top box. The application of the copy protection process is controlled and managed by system control/access software of the system control software that resides in the video service provider's operations control and billing center.

All set-top boxes in the network need to contain copy protection circuitry. If a set-top box does not have copy protection capability then the video service provider is able to identify those set-top boxes and deny them copy protected PPV programming.

DETAILED DESCRIPTION OF THE PREFERRED EMBODIMENT

Figure 1:
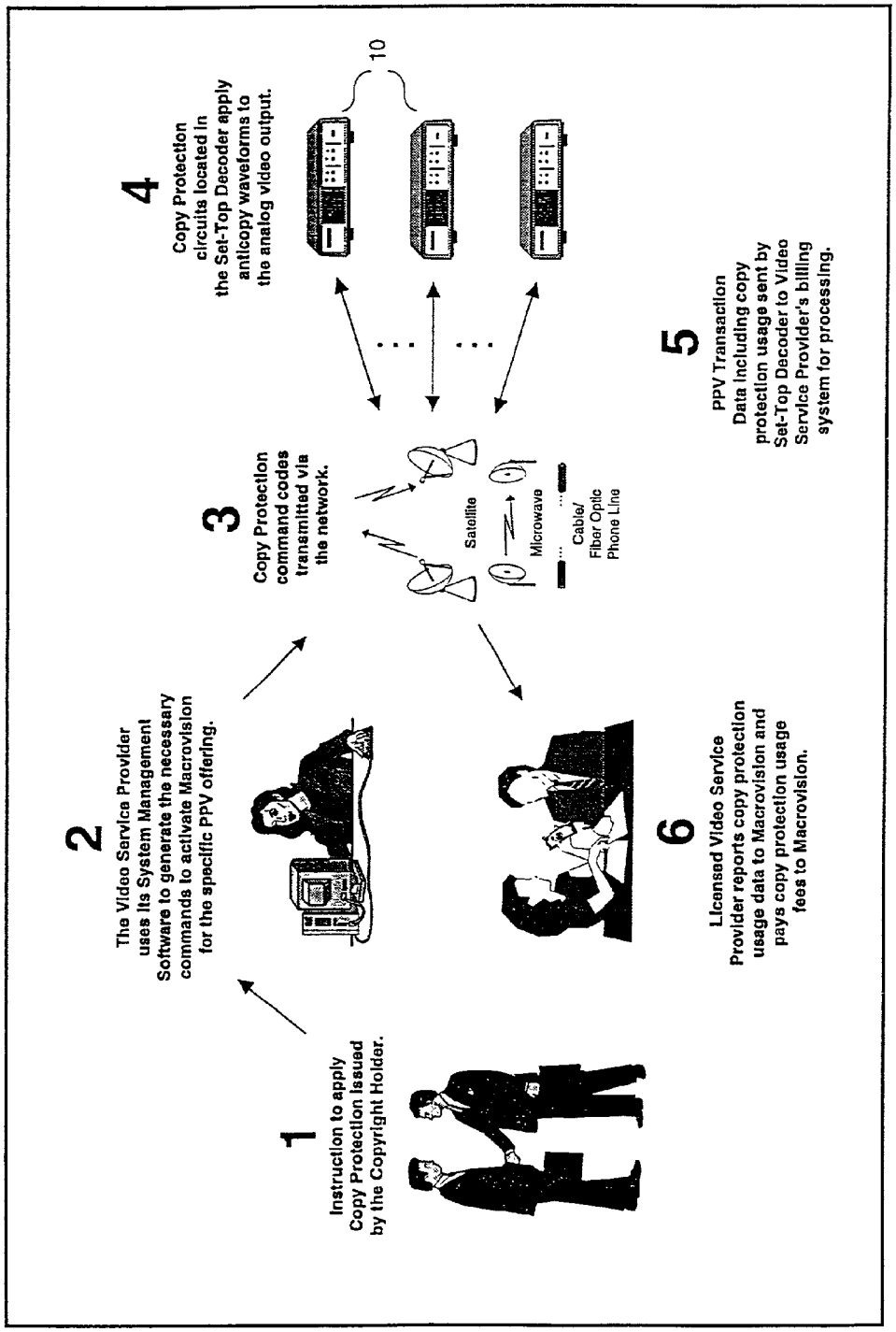
FIG. 1 is a diagram depicting a summary of the functions of the present invention.

The basic copy protection which is controlled and tracked in accordance with the present invention, is the subject of numerous patents and co-pending applications. The PPV copy protection process works by exploiting the differences between the way television (TV) sets and VCRs respond to video signals. The two components of the anticopy process are known as the automatic gain control (AGC) and Colorstripe™ processes. The purpose of these two separate components or processes is to modify the video signal in a manner which has no effect on a TV set but which inhibits a recording VCR from making a watchable copy.

The combination of the AGC based anticopy process and the Colorstripe™ technology developed specifically for PPV applications results in an overall effectiveness rating of more than 95%. This means that over 95% of unauthorized copies will be either unwatchable or have substantially reduced entertainment value.

Security is also a major factor in the operational effectiveness of PPV copy protection. Security is a measure of the difficulty in bypassing or defeating the anticopy process. Ideally the system is completely undefeatable, but as a practical matter the copy protection system needs to be secure enough to thwart attempted breaches by typical consumers, including reasonably sophisticated consumers. The security system is successful if the vast majority of consumers are prevented from taping PPV programs in the home.

Both video service providers (VSPs), that is, PPV providers, and rights owners benefit when current movie programming is offered to consumers at the same time or shortly after these movies are available on videocassette. Subscribers benefit as well since this scenario provides them with more choices and added convenience.

As digital PPV programming generates increasing revenue for rights owners and becomes a viable viewing option to prerecorded videocassettes, video service providers will be called upon to copy protect PPV programming so that the videocassette rental and videocassette sell-through businesses are not compromised. Rights owners also will require video service providers to monitor, control, track, and report the application of copy protection on each video program for billing purposes.

Copy protection has emerged as a key element in the delivery of PPV programming via digital signal delivery networks. The aggregate system implications of copy protection are very manageable, but only when designed as a part of the overall digital delivery system architecture.

The description of the present invention is intended to apply to systems where one or more video service providers are, or will be in the future, connected to a pay-per-view (PPV) service. The PPV service can be either a video-on-demand (VOD) format, or a near video-on-demand (NVOD) format and digital delivery network, and where set-top boxes (STBs) from multiple manufacturers may be connected to the network. It is assumed that one class of technology will be deployed initially [such as Direct Broadcast Satellite (DBS), Multi-point Microwave Distribution System (MMDS), telephone line or Hybrid-Fiber Coax (HFC)] to be followed by another class of technology at some future date. Although a different technology may arise, it is intended that the invention is applicable to use with multiple platforms and technologies.

FIG. 1 illustrates a control and tracking method and system for enabling and controlling the application of copy protection of video signals and the like via digital video networks.

Station 1 represents the issuance of instructions to video service providers by program rights holders who hold the copyrights, for the application by the providers of copy protection to the programs which are protected by per-per-view (PPV) or pay-to-tape (PTT) requirements.

Station 2 depicts a control and billing center of the licensed video service providers who supply copy protection control software for the respective protected programs being broadcast, to generate the commands required to activate, control and reconfigure the copy protection process for each specific PPV/PTT program offering. Although a single provider is depicted, it is understood that station 2 represents any plurality of video service providers each with their respective proprietary control and tracking (billing) software, in accordance with the present invention.

Station 3 represents the procedure of transmitting the particular copy protection command codes of the respective providers, for the PPV/PTT program offerings, via the typical broadcasting networks. Such transmissions may be made by satellite, by microwave, by phone line or by cable transmission systems as depicted.

Station 4 represents the subscriber's home, or other receiving facility, and includes a set-top box 10 for each of a multitude of subscribers. Each set-top box contains copy protection circuitry including a digital color encoder integrated chip (IC), which is adapted to apply selected anticopy waveforms to the analog or digital video signal which is supplied therefrom to a television set or monitor. The receiving facility is further described in FIG. 2.

Station 5 represents the procedure whereby data identifying each PPV or PTT transaction, including copy protection usage, is sent by the set-top box 10 back through the transmission networks of station 3, generally to the respective video service provider's control and billing (tracking) center. The center includes billing procedures which are a subset of the system control software and which process the return transaction data to provide for billing the subscriber for the PPV or PTT transaction usage.

Station 6 represents the procedure whereby each of the licensed video service providers report the copy protection usage to the program rights holder, whereby the provider pays the copy protection fees to the rights holder, i.e., the licensor.

Figure 2:
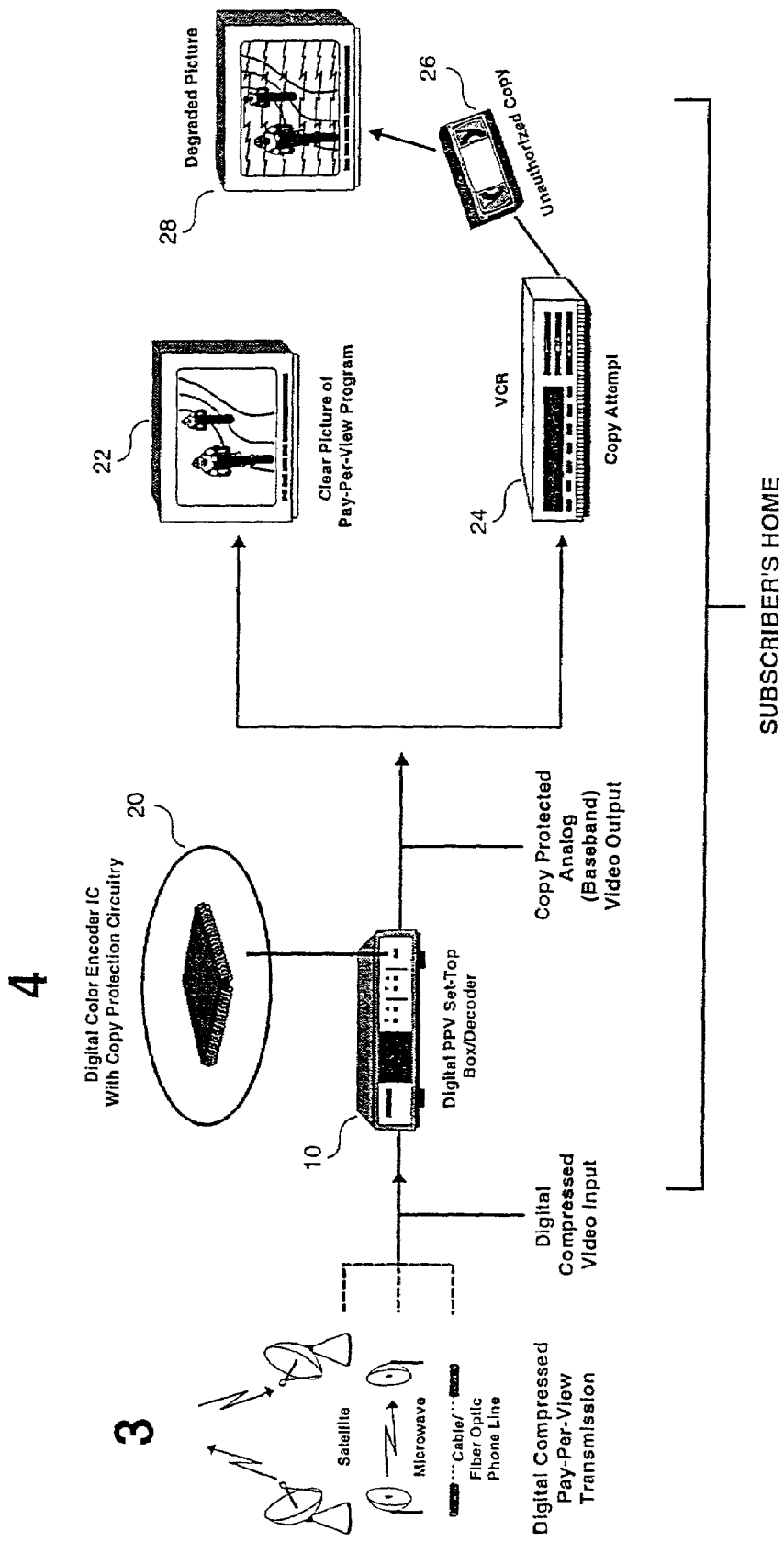
FIG. 2 is a block diagram depicting a typical digital set top box/decoder of the present invention.

FIG. 2 illustrates in further detail the subscriber's facility, station 4 of FIG. 1, receiving the digital, and usually compressed, pay-per-view transmissions from the broadcasting networks depicted as station 3 of FIG. 1. The compressed digital video signal, or the like, is supplied to the respective set-top box 10 of a multitude of set-top boxes, wherein each box includes conventional circuits for converting and decoding the digital compressed video signal to an analog (baseband) video signal. The set-top box 10 also includes a digital color encoder IC 20 of previous mention which contains copy protection circuitry for applying the selected copy protection waveforms to the analog (or digital) video signal, namely, the programs which are being protected. In this example, the copy protected analog baseband video is supplied by the set-top box to a TV set 22 where the pay-per-view protected program clearly is displayed for viewing if the subscriber is authorized to view the program. If the subscriber is not authorized for a particular PPV protected program, the corresponding picture is modified so as to be un-viewable.

In the event a subscriber records the PPV protected program via a VCR 24 to obtain a taped copy 26 without authorization, the unauthorized copy will be degraded to the degree that it is un-watchable, as depicted by a TV set 28. However, if the subscriber subscribes to a pay-to-tape transaction and to the required higher PTT transaction fee, then the copy is authorized and the resulting taped copy would readily be watchable.

Figure 3:
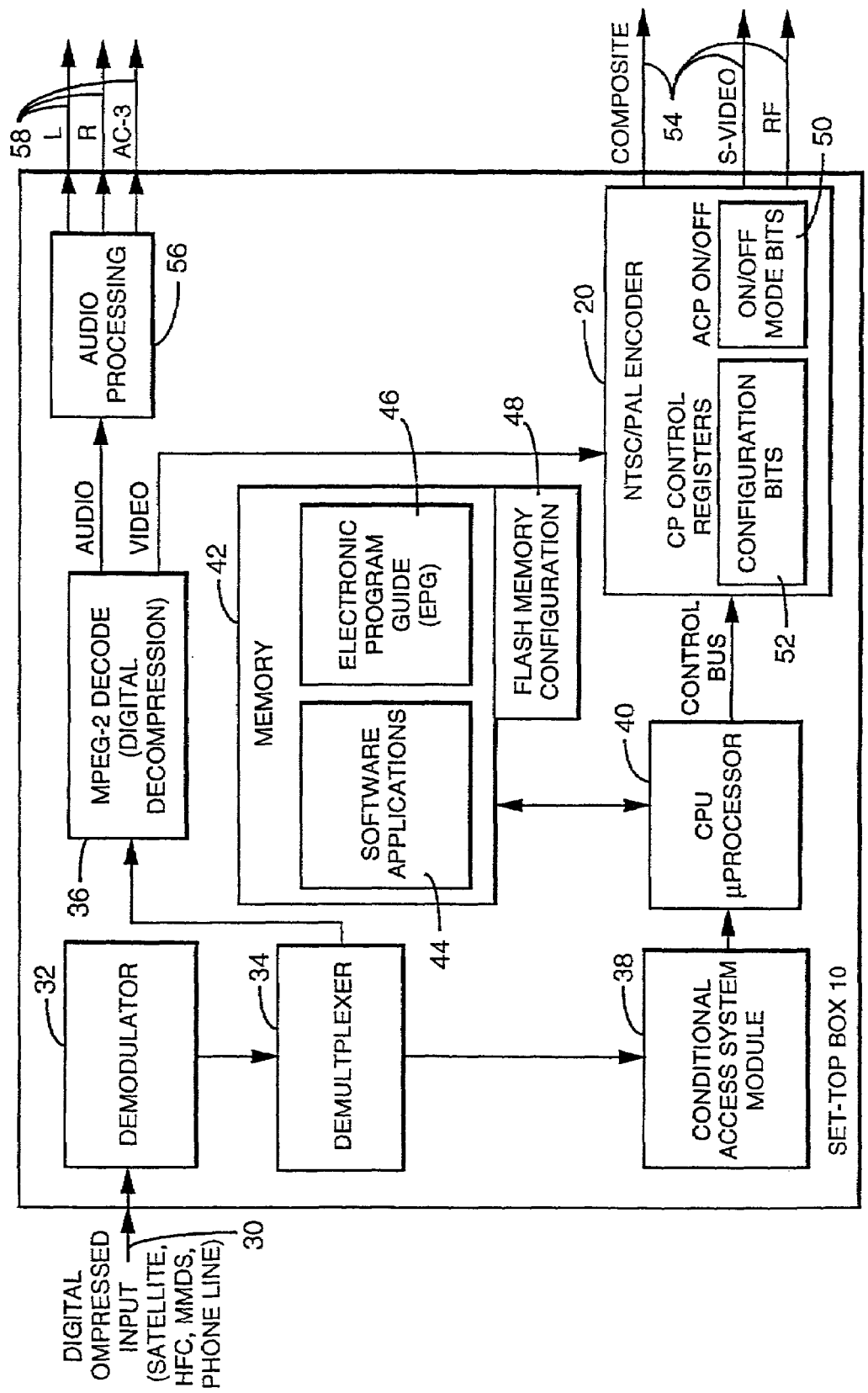
FIG. 3 is a block diagram illustrating an example of the circuitry and architecture of the set-top box of FIG. 2 in further detail.
Figure 4:
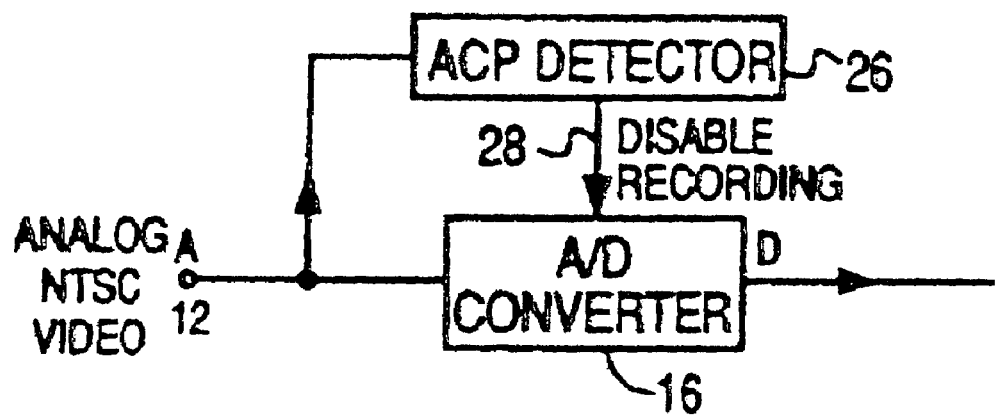
FIG. 4 is a portion of FIG. 3 of U.S. Pat. No. 5,315,448 to Ryan, wherein the Ryan patent '448 is incorporated by reference in page 2, lines 12-17 of the present application.

Referring to FIG. 3, there is illustrated in further detail an architecture of the set-top box(es) 10 of FIGS. 1, 2. Upon power up of the set-top box 10 the configuration bits stored in flash memory 48 are read and written into the appropriate CP control registers 52 in the NTSC/PAL encoder 20. When the compressed digital video signal, including the copy protection control commands of previous and following discussion, are supplied by the delivery network of previous mention (satellite, HFC, MMDS, phone line) to a demodulator circuit 32, as depicted by an input lead 30. The demodulated video/audio and control signals are supplied to a demultiplexer circuit 34 where the video/audio signals are separated into respective channels and supplied to an MPEG-2 decoder and digital decompression circuit 36. The copy protection control commands are supplied from the demultiplexer 34 to a conditional access system module 38. The commands are supplied to a microprocessor in a CPU 40. The CPU processes information located in memory that is associated with the Electronic Program Guide (EPG) 46 or runs the copy protection application software 44 residing in memory 42 to deliver the activation command to the NTSC/PAL encoder 20. The EPG may also have data which is used to determine if copy protection should be activated. There are additional methods that may be employed to activate copy protection.

In response to the control commands, the CPU 40 supplies control signals to the NTSCIPAL encoder IC 20 of previous mention, FIG. 2. The encoder IC 20 includes copy protection control registers 50, 52 for receiving the mode bits and configuration control bits respectively, of previous and following discussion. The configuration bits 52 determine the form of the copy protection (i.e., where the Pseudo Sync and AGC pulses will be located or positions of the colorstripe lines etc.) The on/off/mode byte 50 determines which components of the copy protection process will be activated. See table 1 below. The encoder IC 20 also receives decompressed video from the MPEG-2 decoder and digital decompression circuit 36. Encoder IC 20 outputs a RF signal, a composite video signal and/or an S-video signal via video leads 54. The decompressed audio signal is supplied from the circuit 36 to an audio processing circuit 56 which, in turn, outputs left and right channel stereo signals and/or an AC-3 signal on audio leads 58.

In accordance with the invention, the set-top box needs to satisfy certain requirements to insure that the copy protection process is correctly generated, controlled and tracked. Control and tracking of the copy protection process usage takes place at the VSP's control and billing center, station 2 of FIG. 1. This in turn requires that certain capabilities exist which involve the set-top box, the system control and the billing systems and programs in order to satisfy these requirements.

There follows a description of the requirements which ensure that the copy protection process or technique is correctly activated and controlled and its usage tracked. It is expected that if non-compliant set-top box hardware is attached to the digital delivery network, that each licensed service provider will be able to identify such hardware as non-compliant and will withhold copy protected programs from the respective subscriber.

Implementation of these control requirements over the network (i.e. control of the anticopy process from the program origination control and billing center) requires knowledge of the set-top box control system and process, the application program interfaces (API) present at the box and the dialog between it and the integrated circuit (IC) which incorporates the copy protection apparatus.

Copy protection control software (CPCS) is a software module or set of software modules that reside in the service providers system control software (SCS). It provides a system operator (that is, the service provider) with an interface to manage the necessary attributes of the pay-per-view copy protection in accordance with the present invention.

For security reasons there needs to be the capability to control access to the CPCS from the system control software. This restriction is designed to limit access to the CPCS for control of the copy protection process. The operating system supporting the SCS is generally the first level of security. Every employee is required to enter a login account and password. Without these an employee is denied access. The employee's account specifies the respective privileges. A system administrator of the service provider is responsible for the assignment of the employee's privileges.

Thus, every executable file residing on the host which is capable of modifying the operational status of the copy protection process has permissions restricted to authorized personnel. Without the proper permissions, the personnel are unable to run the executable software.

The CPCS is the portion of the video service provider's software control where the decision to apply the options of pay-per-view and pay-to-tape are applied on a program-by-program basis.

There is access control to the CPCS either through password control or the assignment/denial of privileges through software. If password control is the selected method then once the correct initial password is entered, CPCS forces the selection of a new password for future access to CPCS. In this way the service provider can limit access to CPCS to those employees who carry the authority to modify the copy protection database. The password is valid for a reasonable amount of time before it expires and selection of a new password is required.

Additionally there is an access control to a subsystem within the CPCS that allows the modification of selected bits which define the configuration control and mode, and thus determine the characteristics, of the copy protection process. Any unauthorized changes to these bits can result in severe playability and effectiveness problems. In order to maximize the security of the system the video service provider needs to have a short list of personnel who are authorized to change these bits.

A mode control group controls access to the mode bits. This group has the ability to change the contents of the mode byte(s) which is sent with each PPV program to activate or deactivate the copy protection process. The membership of this group is controlled by the system administrator. The number of the service provider's personnel allowed in this group is kept to a minimum.

Similarly, a configuration control group controls access to the configuration bits. This group has the ability to change the contents of the configuration bits which define the copy protection process. These are the bits that are sent periodically to every set-top box to assure that all boxes are using the correct version of the process. The number of the service provider's personnel allowed in this group also is kept to a minimum.

Each password described below should be at least eight (8) alpha-numeric characters in length. The system administrator is responsible for defining and distributing the current password to the authorized personnel. Each password described below should have a life of no more than four months before the system administrator changes the password.

Password access to the software that applies or removes the copy protection process on a program-by-program basis is designed to query mode or configuration control group authorized personnel for an authorization password to ensure that they are a member. If the authorized personnel correctly enter the password they will be allowed to apply or remove the copy protection for a particular PPV or series of PPV events. Conversely, if authorized personnel fail to enter the password they must be denied access to that portion of the database. It is the system administrator's responsibility to ensure that only authorized personnel know the password for either the mode or configuration control. An authorized personnel will be given three attempts to login before a message is generated for the system administrator that an unauthorized request to modify the application or remove the copy protection has been made.

Alternative proposals for accessing CPCS and controlling access to the mode and configuration of the copy protection process may be developed by one skilled in the art.

The CPCS will perform the following functions: Copy protection on/off and mode control; copy protection validation; functionally unlocking copy protection capability in a set-top box; and copy protection process configuration reprogramming.

The copy protection process which is incorporated in the set-top box is controlled by the CPCS at the licensed video service provider's control and billing central location. The need to invoke copy protection on an individual program forms part of a descriptor for each program. A default for copy protection within the descriptor needs to be turned off (i.e., no copy protection).

Steps need to be taken to prevent copy protection being applied to non-PPV program channels, since copy protection can be licensed only for PPV programming. If the system control software automatically verifies that a program is designated for PPV use, this requirement may be automated. Similarly, access to CPCS may be automatically denied for non-PPV programming. If such an automatic verification is not made, a warning notice is generated when CPCS is accessed to change the copy protection status of a program. This notice needs to be displayed until a specific keyboard entry is made to acknowledge the warning.

In the case of MPEG signals, the MPEG copyright header bits on their own are not sufficient to activate copy protection in the set-top box. The following reasons are the basis for not allowing the MPEG header bits to be used as the sole control of the copy protection process. An application routine is required in order to (a) differentiate between digital-to-digital and digital-to-analog copy protection conditions, (b) provide sufficient control capacity to set the copy protection operating mode, and (c) facilitate access to the copy protection system only by licensed video service providers.

It is preferred that the anticopy process on/off control is achieved by setting all the individual parameter on/off and mode control bits rather than a master on/off control. This requires that the NO (N-zero) bits in the control bit listing be set as required. Depending on the individual system, this will require the control of from 5 to 8 bits.

The delivery of the mode byte to the set-top box to activate or deactivate the copy protection process may be accomplished in several ways. Each method has its positive aspects as well as its negative aspects. When selecting a mechanism to control the copy protection technology, a service provider selects one of the following means or may develop an entirely new means.

One method may be for the mode byte to be delivered via the conditional access system via the entitlement control message (ECM). Another method might be to include the mode byte in a private data field in the MPEG transport data stream.

Another method may deliver the mode byte in a user defined section of the electronic program guide (EPG) that is not identified in released documentation as controlling copy protection. This method also requires some additional security to keep the memory location of the mode byte from being accessed for unauthorized changes and the setting of a return flag that indicates the actual status of the mode byte when transmitted to the NTSC encoder.

Another method may be a combination of the conditional access ECM and EPG. The transport of the mode byte in the EPG could be combined with two bits within the ECM. To activate the copy protection technology then it would be an or operation between the ECM bits and the EPG bits. If either is set, the copy protection technology, both ECM and EPG would have to indicate that deactivation is necessary.

When a copy protected PPV program is viewed, part of the information that will need to be tracked will be the actual setting of the mode byte. In this way both the copy protection process and the service provider will have a means to discover if copy protection has been circumvented in the set-top box. The return flag may be a simple bit set to 'true' to indicate that the copy protection process was correctly activated and 'false' if it was incorrectly activated. It is required that the mode byte be sent to the NTSC encoder on a periodic basis. The frequency of the transmission is on the order of once every minute.

Setting the operating mode of the copy protection process requires independent activation of the three component parts of the copy protection process (pulses within the vertical blanking interval, pulses at end of field, colorburst phase modification) and up to 5 additional mode set parameters using NO bits as indicated above.

Access to copy protection at the set-top box by the video service provider needs to be restricted to authorized providers. This should not to be confused with access to the CPCS as defined earlier. It follows that each system operator or video service provider is required to procure the means (i.e., keys/codes, etc.) to activate the copy protection system control software on a program-by-program basis. When a service provider obtains the means to activate copy protection, the provider will gain access to the copy protection process at the set-top box. The copy protection process (i.e. on/off/mode or reprogramming commands) at the set-top box needs to have controlled access such that only authorized providers can issue valid commands to the box. The set-top box needs to reject commands for the copy protection process from unauthorized video service providers.

Set-top boxes such as depicted in FIGS. 1, 2, may be shipped by the manufacturer with the copy protection capability installed, but functionally locked. This means that the set-top box will not respond to any copy protection control codes. However, the set-top box will be unlocked (i.e. enabled) by a message initiated via the CPCS or SCS and sent through the system by a licensed video service provider. This message may be sent as part of the log-on routine when a subscriber accesses a provider. This message need only be acted upon once by the set-top box during the lifetime of the box. Only authorized video service providers are provided with the unlocking message data.

The copy protection unlock message consists of at least 8 bytes. The set-top boxes are manufactured with an appropriate unlock message code. This code is provided by the set-top box manufacturer only to a copy protection licensor, who in turn provides the code to licensed video service providers.

The copy protection unlock message is different for each set-top box manufacturer, but is the same for all boxes made by that manufacturer.

Alternative proposals on the methodology to enable the copy protection process in the set-top box will be apparent to those skilled in the art.

To ensure that over the life of the set-top box the copy protection process provides the maximum effectiveness with VCRs and compatibility with TV sets, the copy protection system needs to be upgradeable on a system-wide basis by means of commands initiated by the CPCS. This will result in new process configuration data being transmitted. In response, the set-top box processes the data to reconfigure the adjustable parameters of the copy protection process. The set-top box may be placed in a "diagnostics" mode for this feature implementation, or the configuration data may be sent and acted on by the box on a routine basis as part of the program description data or log-on routine.

However, it is recommended that the entitlement control message (ECM) be used. The ECM is embedded in the conditional access system.

In one version, configuration data of 108 bits is provided to accommodate the reconfiguration data, however, 108 bits does not fall on a byte boundary. Therefore, it is recommended that 112 be sent with a pad 0. The data is presented to the service provider in the form of hexadecimal numbers for entry into the CPCS. The 112 bits thus are entered as a string of 28 hexadecimal numbers.

In another version, configuration data of 132 bits is provided to accommodate the reconfiguration data, however, 132 bits does not fall on a byte boundary. Thus, it is recommended that 136 be sent with a pad 0. The data is presented to the provider in the form of hexadecimal numbers for entry into the CPCS. The 136 bits thus are entered as a string of 34 hexadecimal numbers.

It is possible to verify the current configuration stored by the CPCS by accessing the current contents of the configuration bits presented as the correct number hexadecimal characters. An alpha-numeric password of at least 8 bytes is required to gain access to change the programming data within CPCS. This password is separate from the password which allows access to CPCS. The service provider has the option of receiving the 'C' source code of an executable file to which to pass parameters.

The following warning notice is presented on the screen of the operational control and billing center of a provider after entering the correct password:

WARNING

Changing this copy protection configuration data without the written authorization carries the serious risk of problems with the performance of the copy protection system and degraded picture quality.

This warning notice is displayed until a specific keyboard entry is made to acknowledge the warning.

By way of example only, Table 1 illustrates a mode control bit listing which defines the corresponding bit pattern or command, which provides the routine on/off and mode selection functions when transmitted to the set-top boxes via the delivery networks. The configuration control bit listing is generally equivalent to that of the mode control, though relatively longer since it controls considerably more control and reprogramming functions.

TABLE 1

Mode Control Bit Listing
Routine On/Off and Mode Selection

| NO | On/off and mode control; 8 bits | | |
|---|---|---|---|
| NO[7] | Reserved | | CPC0[3] |
| NO[6] | Pay-to-tape allowed/prohibited | (Allowed=1, Default=0) | CPC0[2] |
| NO[5] | VBI pulses On/Off (VBIP) | (ON=1) | CPC0[1] |
| NO[4] | End of Field Back Porch Pulses on/off (EOFP) | (ON=1) | CPC0[0] |
| NO[3] | Colorstripe process On/Off (CSP) | (ON=1) | CPC1[3] |
| NO[2] | AGC pulse normal (amplitude cycling)/static mode select (AGCY) | (Cycling=Default=1) | CPC1[2] |
| NO[1] | H-sync amplitude reduction On/Off (HAMP) | (ON=1) | CPC1[1] |
| NO[0] | V-sync amplitude reduction On/Off (VAMP) | (ON=1) | CPC1[0] |

The pay-per-view transaction information is collected by each video service provider for each subscriber so that monthly copy protection activity reports required for royalty payments and other fees may be generated. The reports include information regarding the number of subscribers accessing each copy protected program, with subtotals of the copy protection status or options selected by respective subscribers. The reports further include information sorted by PPV title, PPV program supplier, copy protection activation status requested by the subscriber, and by set-top box model code. The reports are provided by the report generating software of previous mention at the video service provider centers.

The activity report includes a manufacturer and model type descriptor code in the transaction acknowledgment between the set-top box and the control and billing system when a PPV purchase transaction is reported to the provider.

The CPCS and the set-top box are capable of applying and reporting anticopy usage according to the following conditions. The overall system allows the subscriber's copy protection to be turned off at the box only as permitted by the PPV program rights holder.

(a) PPV Program Rights Holder Permits Viewing Only:

The pay-to-tape mode is prohibited (off). All STBs output copy protected waveform only i.e., the copy protection waveform unconditionally appears on the set-top box analog video output signal.

This is reported to the billing system as a "pay-per-view" copy protected transaction.

(b) PPV Program Rights Holder Permits Viewing and Recording:

The pay-to-tape mode bit is set for pay-to-tape permitted (on). Under this option, when the subscriber selects the "pay-to-tape" option, the copy protection process is turned "off" in the STB to allow the PPV program to be recorded (taped) for a higher transaction fee than for "viewing only." i.e., the copy protection waveform will not be present on the STB analog video output signal.

This is reported to the billing system as a "pay-to-tape" copy protected transaction.

The following Table 2 provides a summary of the control options and includes additional information.

TABLE 2

Pay-per-view and Pay-to-tape Control Options for Pay-per-view Programs

| Program Descriptor of PPV Program | Consumer Request (Pay-per-view or Pay-to-tape) | Result |
|---|---|---|
| Copy protection NOT required | N/A | ACP off |
| Copy protection REQUIRED Taping NOT permitted | Pay-per-view | ACP will be ON. Pay-per-view transaction cost incurred by consumer. |
| Copy protection REQUIRED Taping NOT permitted | Pay-to-tape | Requested option not available. ACP will be ON. Pay-per-view transaction cost incurred by consumer. |
| Copy protection REQUIRED Taping permitted (at higher transaction cost) | Pay-per-view | ACP will be turned ON by STB control system. Pay-per-view transaction cost incurred by consumer. |
| Copy protection REQUIRED Taping permitted (at higher transaction cost) | Pay-to-tape | ACP will be turned OFF by STB control system. Pay-to-tape transaction cost incurred by consumer. |

It is to be understood that various terms employed in the description herein are interchangeable. For example, a "video service provider" also is known as a pay-per-view (PPV) provider or a system operator, and the "system management software" preferably is referred to as the system control software. Likewise, the "control and billing centers" of the PPV providers represented by station 2 (and generally station 5) also may be referred to as operations control/tracking centers, program origination/termination centers, headend (cable)/ uplink (satellite) control centers, etc. A licensed PPV provider facility supplies the necessary control instructions to associated software and/or circuitry in a set-top box to allow a respective subscriber access to program material to which he or she is entitled, and also receives at designated times of the week, month, etc., the usage data automatically returned by the set-top box. A billing and license fees software subset of the system control software then enables each PPV provider to bill the subscribers and to report and pay the attendant licensing fees to the rights holders, etc.

Accordingly, the above description of the invention is illustrative and not limiting. Further modifications will be apparent to one of ordinary skill in the art in light of this disclosure. For example, although the invention is described herein relative to a video signal, and primarily an analog video signal, it is to be understood that the invention concepts may be applied to other signals with properties equivalent to a video signal where copy protection is desired. Likewise, the invention is applicable to the copy protection of digital as well as analog signal materials, such as those disclosed in the U.S. Pat. No. 5,315,448 of previous mention. Further, although a specific example of a code word is disclosed herein for enabling the copy protection process via the set-top box, other combinations and numbers of bits may be employed. In addition, a selected portion of the control software for effecting the copy protection process may reside in the set-top box in the form of an insertable "smart" card, wherein for example the smart card contains the data concerning the subscriber's options and privileges.

Thus, the scope of the invention is defined by the following claims and their equivalents.

What is claimed is:

1. A method of providing programmable copy protection of a video signal demodulated from a transmitted signal via a digital delivery network, wherein one or more copy protection signal prevents copying and/or subsequent viewing of a recording of the video signal while allowing viewing of the video signal which includes the one or more copy protection signal, comprising:
generating a copy protection command having a mode control command and programmable configuration bit patterns indicative of respective one or more copy protection signals;
receiving the transmitted signal and the mode control command in at least one device coupled to the network; and
providing the one or more copy protection signal to the video signal to produce a copy protected video signal in the at least one device in response to one or more programmable configuration bit pattern selected by the mode control command, to prevent said copying or subsequent viewing of the recording of the copy protected video signal, wherein the copy protected video signal is viewable.

2. The method of claim 1 including:
applying the transmitted copy protection signal to the video signal in response to the one or more programmable configuration bit pattern selected by the mode control command.

3. The method of claim 1 including:
storing the one or more copy protection signal in the at least one device; and
recovering the one or more copy protection signal from storage and applying the recovered one or more copy protection signal to the video signal in response to the one or more programmable configuration bit pattern selected by the mode control command.

4. The method of claim 1 wherein:
said copy protection command includes the programmable configuration bit patterns indicative of a plurality of copy protection signals; and
wherein two or more copy protection signals are applied to the video signal in response to respective programmable configuration bit patterns selected by the mode control command.

5. The method of claim 1, including:
storing said one or more copy protection signal in the at least one device;

recovering the one or more copy protection signal from storage in response to one or more programmable configuration bit pattern selected by the mode control command; and
applying the one or more copy protection signal to the video signal to modify the video signal such that the copy protected video signal is viewable but uncopiable.

6. The method of claim 1 wherein the mode control command and the programmable configuration bit pattern each comprise one or more bit.

7. The method of claim 1, wherein the copy protection command includes a bit pattern for on/off/mode control and a multiple bit pattern which defines the programmable configuration bit patterns wherein the configuration bit patterns identify respective signals of the one or more copy protection signal.

8. The method of claim 1 wherein the one or more copy protection signal comprises a plurality of copy protection signals, and wherein each signal of the plurality of copy protection signals is identified by a corresponding programmable configuration bit pattern which is selectable by the mode control command.

9. The method of claim 1 wherein the one or more copy protection signal include one or more of the following; vertical blanking interval (VBI) pulses On/Off, end of field back porch pulses On/Off, color stripe process On/Off, automatic gain control (AGC) pulse normal (amplitude cycling) or static mode select, H sync amplitude reduction On/Off, V sync amplitude reduction On/Off.

10. A system for controlling programmable copy protection of a video signal demodulated or derived from a transmitted signal via a digital delivery network, wherein a service provider enables providing one or more copy protection signal to the video signal which prevents unauthorized copying or subsequent viewing of a recording of the video signal, the system comprising:
a copy protection command having a mode control command of one or more bit included with the transmitted signal, and a programmable configuration bit pattern indicative of the one or more copy protection signal; and
a device for applying the one or more copy protection signal to the video signal to produce a copy protected video signal in response to a corresponding programmable configuration bit pattern selected by the transmitted mode control command, to prevent copying or subsequent viewing of the recording of the copy protected video signal, wherein the copy protected video signal is successfully watchable.

11. The system of claim 10 wherein the one or more copy protection signal is transmitted to the device.

12. The system of claim 10 wherein the one or more copy protection signal is stored in the device.

13. The system of claim 10 wherein:
the programmable configuration bit pattern determines one or more programmable operating configuration corresponding to the one or more copy protection signal;
the transmitted signal is provided by a service provider, and wherein the transmitted signal provides the programmable configuration bit pattern; and
the device selectively applies the one or more programmable operating configuration to the video signal in response to the mode control command.

14. A method of providing programmable copy protection of a video signal derived from a transmitted signal to devices via a digital delivery network, wherein one or more programmable copy protection signal provided to the video signal produces a copy protected video signal which prevents copying or subsequent viewing of a recording of the copy protected video signal while allowing watching of the copy protected video signal, comprising:

receiving the transmitted signal and a copy protection command at one or more of the device, which copy protection command is indicative of the one or more programmable copy protection signal to be applied to the video signal;

wherein the copy protection command includes a mode control command and one or more programmable configuration bit pattern indicative of the one or more copy protection signal; and applying the one or more copy protection signal to the video signal to produce the copy protected video signal in response to the programmable configuration bit pattern selected by the mode control command in the one or more device, to prevent unauthorized copying or subsequent viewing of the copy protected video signal, wherein the copy protected video signal is viewable.

15. The method of claim 14 wherein the one or more copy protection signal is received by the one or more device.

16. The method of claim 14 wherein the one or more copy protection signal is stored in the one or more device.

17. The method of claim 14 wherein:

the one or more copy protection signal comprises a plurality of different copy protection configurations;

the programmable configuration bit pattern comprises a plurality of bit patterns corresponding to respective copy protection configurations to be applied to the video signal; and the selected copy protection configuration, or configurations, is applied to the video signal in response to the programmable configuration bit pattern as enabled by the mode control command.

* * * * *